UNITED STATES PATENT OFFICE.

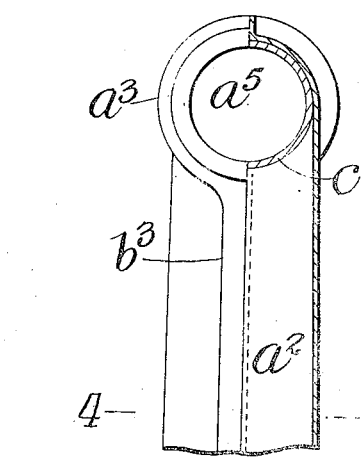
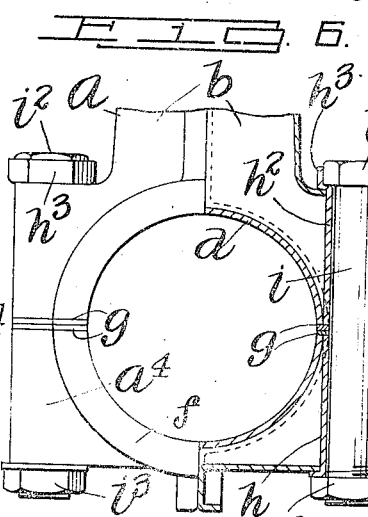
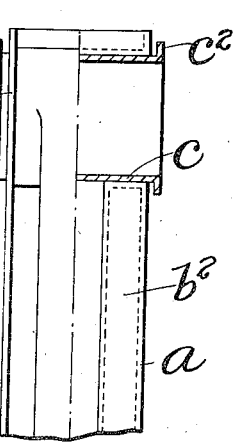
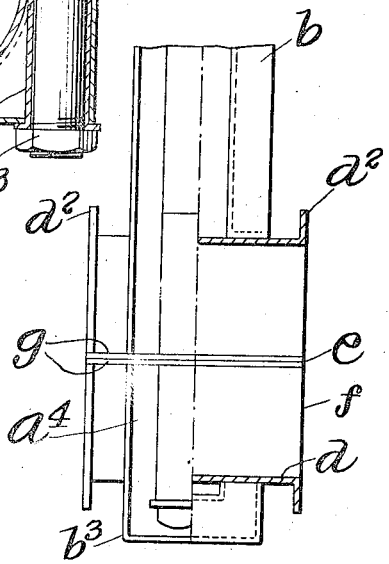
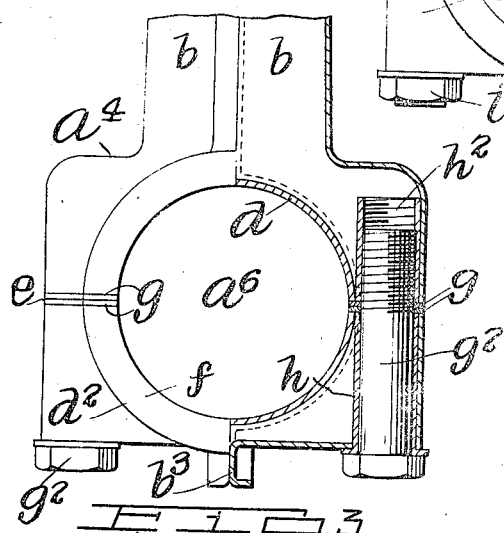
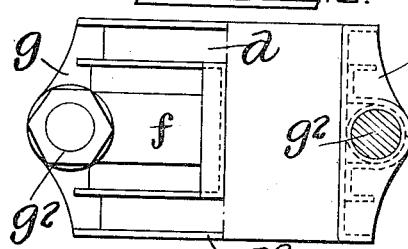
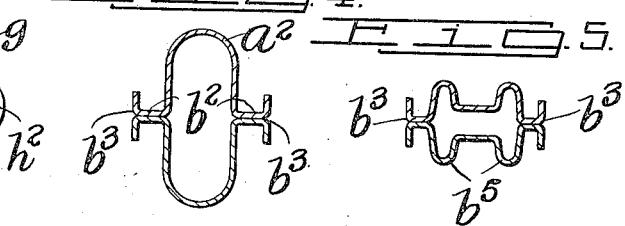

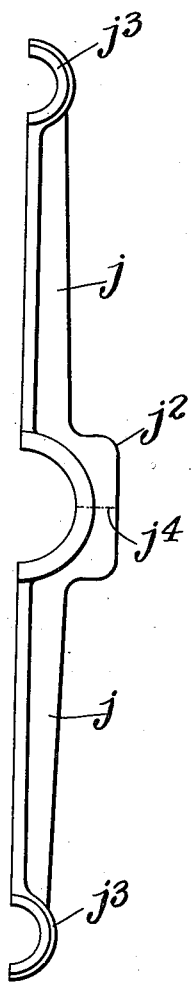
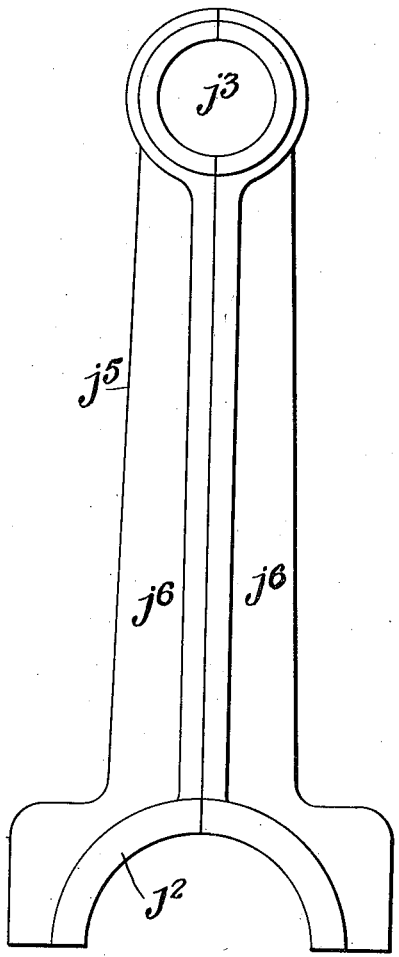

HEBRON B. LAYMAN, OF NEW YORK, N. Y., ASSIGNOR TO THE LAYMAN PRESSED ROD CO., INC., OF NEW YORK, N. Y., A CORPORATION OF NEW YORK.

CONNECTING-ROD.

1,218,572.  Specification of Letters Patent.  Patented Mar. 6, 1917.

Application filed August 9, 1915. Serial No. 44,438.

*To all whom it may concern:*

Be it known that I, HEBRON B. LAYMAN, a citizen of the United States, and residing at New York, in the county of New York and State of New York, have invented certain new and useful Improvements in Connecting-Rods, of which the following is a specification, such as will enable those skilled in the art to which it appertains to make and use the same.

This invention relates to connecting rods, and particularly to connecting rods made from sheet metal, and the object thereof is to provide an improved connecting rod which is composed of two separate longitudinal parts, separated in the plane of the axis of the crank shaft, said parts being connected by riveting, welding, brazing, or in any other preferred manner known to the art; another object is to provide such a rod in which the crankshaft head end of the rod is divided transversely to form a cap.

The invention is fully disclosed in the following specification, of which the accompanying drawing forms a part, in which the separate parts of my improvement are designated by suitable reference characters in each of the views, and in which:—

Figure 1 is a side view of the connecting rod made according to my invention, and one-half of which is shown in section;

Fig. 2 a view similar to Fig. 1, but at right angles thereto;

Fig. 3 a bottom plan view of the device as shown in Fig. 1, one-half being in section;

Fig. 4 a cross section of the line 4—4 of Fig. 1;

Fig. 5 a view similar to Fig. 4, but showing a modification;

Fig. 6 a view similar to Fig. 1, but showing a modification.

Fig. 7 a side view of a partially formed connecting rod, the shank, the piston pin head portion and the crank shaft head portion with the exception of the cap being formed from a single piece of sheet metal; and, Fig. 8 a view of the complete rod with the exception of the cap.

In the practice of my invention, I provide a connecting rod $a$, comprising shank portion $a^2$, a smaller end portion $a^3$, and a larger end portion $a^4$, and, as in other devices of this class, the smaller end or head portion $a^3$ connects with the piston of the engine, while the larger end or head portion $a^4$ is connected with the crank shaft of the engine, and said end or head portions are provided respectively with the usual apertures or openings $a^5$ and $a^6$.

The rod consists also of two similar longitudinal parts $b$ of sheet metal, connected in the plane of the crank shaft, or in a plane passing through the axis of the apertures $a^5$ and $a^6$, and said parts are provided with abutting flanges $b^2$, which extend entirely around the rod longitudinally thereof, and which, when said parts are connected to form the complete rod, constitute or form a T-shaped flange $b^3$, which extends entirely around the rod longitudinally thereof and in the plane of the crank shaft, or the plane passing centrally through the apertures $a^5$ and $a^6$.

In Fig. 4, the shank portion $a^2$ of the rod is shown as approximately elliptical in transverse section, but my invention is not limited to any particular form or shape of the shank portion of the rod, and in Fig. 5, I have shown a modification in which both sides of the shank are provided with longitudinal ribs $b^5$.

As hereinbefore stated, the separate parts of the rod are composed of sheet metal, preferably sheet steel, and are cut, stamped, drawn, or otherwise formed into the desired shape, and the piston pin aperture $a^5$ through which, in practice, is passed a pin which connects the rod with the piston of the engine, is provided with a sleeve bearing $c$, which is preferably projected slightly at both ends, and provided with flanges $c^2$, and the larger aperture $a^6$, in the larger end or head portion of the rod, and through which the crank or crank pin of the crank shaft portion is passed is also provided with a sleeve bearing $d$, which is also projected slightly at both ends, and provided with end flanges $d^2$.

The separate parts of the rod including the sleeve bearings $c$ and $d$ are preferably first connected by welding and are then brazed, but said parts of the rod may be connected in any desired manner, and, in practice, the larger end or head portion $a^4$ is cut, sawed, or otherwise divided transversely, as shown at $e$, to form a cap $f$, the abutted faces of the rod and cap, where parted, are provided with abutting plates $g$. The object of these is to provide a good firm surface of great area to take the tension of the bolts which hold the cap in place. These abutting plates are permanently connected to the rod and to the cap. The cap $f$ is provided with tubes $h$, which open through the bottom thereof, and the other part of the head with corresponding tubes $h^2$, which are threaded interiorly, and bolts $g^2$ are passed through the tubes $h$ and into the tubes $h^2$, for connecting the separate parts of the head, and by means of this construction said parts of the head may be connected and disconnected whenever desired.

In Fig. 6, I have shown a modification in which the tube members $h$ and $h^2$ extend entirely through the separate parts of the head parallel with the axis of the shank of the rod, and bolts $i$ are employed and provided at their upper ends with heads $i^2$, and at their lower ends with nuts $i^3$, and the heads $i^2$ are angular in form, and the tubes $h^2$ are provided with angular rims $h^3$, in which the heads $i^2$ fit, and this construction serves to prevent the bolts from turning when the nuts $i^3$ are screwed on.

A connecting rod made in this manner may be of any desired length or dimension, and the object of the T-shaped flanges where they extend down the shank portion of the rod is to prevent "weaving" or twisting of the rod in manufacture and in operation. Where the T-shaped flanges part and extend radially around the piston pin aperture $a^5$, these flanges very materially increase the resistance to the spreading of the bore while in service. Especially at the crank end of the rod where the cap is cut from the rod body, there is a tendency for the bore to go out of shape when in service. The tendency is for the bore to become elliptical. In my connecting rod the flanges that extend around the crank aperture very materially reduce the tendency for the aperture to go out of round.

The flange $b^3$ which extends around the rod longitudinally thereof and the flanges around the piston pin aperture and around the crank head or crank shaft aperture in addition to strengthening the rod and rendering it more durable, also serve as heat radiating means, and thus, as will be understood, aid in preventing the rod from becoming overheated.

Wherever in the foregoing description or the following claims I use the phrases or words "a rod composed of two pieces," or "composed of abutting parts," or "formed from or of separate parts," I mean to imply that a cross section of the rod or the shank portion thereof, or an end portion thereof will show two pieces or abutting parts, and also that the said pieces or parts are connected.

My invention is not limited to the exact details of construction herein shown and described, and a rod composed of sheet metal may be formed from a single piece as shown in Fig. 7 consisting of two shank portions $j$, a central crank pin head portion $j^2$ and two piston pin portions $j^3$, and in forming a rod from a single piece the crank pin head portion $j^2$ is cut transversely as shown at $j^4$ and the separate parts thus produced are connected, as shown in Fig. 8 to form a complete rod $j^5$, with the exception of the cap, which may be of the form shown in Fig. 1, or may be composed of a single piece, as in some other rods of this class, and the complete rod shown in Fig. 8, with the exception of the cap, consists of two separate similar parts $j^6$ connected centrally and longitudinally, and said parts are connected in the same manner as the corresponding parts shown in Figs. 1 to 6 inclusive, and it will also be understood that two rods may be formed at one time, by this method of procedure, by providing two of the parts shown in Fig. 7 and cutting them transversely at $j^4$ and then connecting the parts thus formed to produce two of the rods shown in Fig. 8.

Having fully described my invention, what I claim as new and desire to secure by Letters Patent, is:—

1. A connecting rod composed of a plurality of parts connected in the plane of the axis of the crank and provided with a crank bearing, said rod being adapted to be separated through said bearing to form a cap, and said rod and cap being provided with bolt bosses which are formed therein.

2. A connecting rod device comprising a rod formed from sheet metal and a cap, the said rod having butting plates secured thereto.

3. A connecting rod composed of two substantially similar parts connected in the plane of the axis of the crank, the shank portion of the rod being provided with a T-shape flange.

4. A connecting rod composed of two substantially similar parts connected in the plane of the axis of the crank, the shank portion of the rod being provided with a T-shaped flange which forms ribs around the crankshaft aperture.

5. A connecting rod composed of two substantially similar parts connected in the plane of the axis of the crank, the shank portion of the rod being provided with a T-shaped flange which forms ribs around the piston pin aperture.

6. A connecting rod device, comprising a rod and a cap formed from sheet metal, the said cap having butting plates secured thereto.

7. A connecting rod composed of a plurality of parts connected in the plane of the axis of the crank, the crank shaft head of the rod adapted to be divided transversely to form a cap, and the shank portion of the rod being provided with a T-shaped flange.

8. A connecting rod having a cap formed of parts abutting in the plane of the axis of the crank.

9. A connecting rod having a cap formed from parts abutting in the plane of the axis of the crank and permanently secured together.

10. A connecting rod having a cap formed from parts abutting in the plane of the axis of the crank and permanently secured together, said cap having radial flanges extending around the crank shaft aperture.

11. A connecting rod having a cap formed from parts abutting in the plane of the axis of the crank and permanently secured together, said cap having radial flanges formed therefrom and extending around the crank shaft aperture.

12. A connecting rod having a cap formed from parts abutting in the plane of the axis of the crank and permanently secured together and a reinforcing lining for the crank shaft aperture having radial flanges extending therefrom.

13. A connecting rod adapted to be separated to form a cap, the said cap being formed of parts abutting in a plane of the axis of the crank.

14. A connecting rod composed of substantially similar sheet metal parts connected in the plane of the axis of the crank and provided with a crank bearing, said rod being adapted to be divided through said bearing to form a cap and said rod and cap portions having attaching bosses.

15. A connecting rod composed of a plurality of parts connected in the plane of the axis of the crank and provided with a crank bearing, said rod being adapted to be separated through said bearing to form a cap, and the rod and cap portions having connecting means.

In testimony that I claim the foregoing as my invention I have signed my name, in presence of the subscribing witnesses, this 4th day of August, 1915.

HEBRON B. LAYMAN.

Witnesses:
M. BOCKELMAN,
H. E. THOMPSON.